United States Patent [19]

Eskind

[11] Patent Number: 4,657,809

[45] Date of Patent: Apr. 14, 1987

[54] FIRE RETARDANT COMPOSITIONS AND USE THEREOF

[76] Inventor: Larry G. Eskind, 1050 Vaquero Rd., Pebble Beach, Calif. 93953

[21] Appl. No.: 895,763

[22] Filed: Aug. 12, 1986

Related U.S. Application Data

[63] Continuation-in-part of Ser. No. 777,159, Sep. 18, 1985, abandoned.

[51] Int. Cl.$^4$ .......................... B32B 3/26; B32B 27/18; B05D 1/02; C08K 3/10
[52] U.S. Cl. .................... 428/304.4; 252/606; 427/421; 427/429; 427/430.1; 428/308.4; 428/305.5; 428/920; 428/921; 524/409; 524/472; 524/547
[58] Field of Search ............... 252/606; 427/421, 429, 427/430.1; 428/304.4, 308.4, 305.5, 920, 921; 524/409, 472, 547

[56] References Cited

U.S. PATENT DOCUMENTS

| | | | |
|---|---|---|---|
| 3,904,570 | 9/1975 | Jin | 524/409 |
| 3,914,513 | 10/1975 | Brown et al. | 428/921 |
| 3,940,549 | 2/1976 | Whittum et al. | 428/921 |
| 4,018,983 | 4/1977 | Pedlow | 428/921 |
| 4,027,062 | 5/1977 | Engelbrecht et al. | 524/472 |
| 4,064,359 | 12/1977 | Peterson et al. | 428/921 |
| 4,162,342 | 7/1979 | Schwartz | 428/921 |
| 4,225,649 | 9/1980 | Peterson | 428/921 |
| 4,254,177 | 3/1981 | Fulmer . | |
| 4,493,871 | 1/1985 | Edgerley et al. . | |

*Primary Examiner*—William J. Van Balen
*Attorney, Agent, or Firm*—Townsend and Townsend

[57] ABSTRACT

A fire retardant composition comprising, in percent by weight of the non-volatile solids therein, a non-fibrous aqueous mixture of:
(a) 25–90% of an emulsified halogen containing vinyl polymer limited to a maximum bound halogen of 58% on a dry polymer weight basis, selected to bind the composition to a combustible, resilient, foamed or fibrous substrate;
(b) 0–4.8% of a metal oxide gas and fume limiting compound; and
(c) 1–40% of an afterglow limiting component selected from halogenated naturally occurring oils and fats, having a maximum halogen content of 50%, and organo phosphonates, halogenated organo phosphonates and substituted organo phosphonates.

22 Claims, No Drawings

FIRE RETARDANT COMPOSITIONS AND USE THEREOF

RELATED APPLICATION

This is a continuation-in-part of U.S. patent application Ser. No. 777,159 filed Sept. 18, 1985 now abandoned.

BACKGROUND OF THE INVENTION

This invention relates to fire retardant compositions and their use on combustible substrates to impart fire retardancy thereto. More particularly, the invention relates to the use of fire retardant compositions on combustible foamed and fibrous substrates wherein the resiliency of the substrate is retained after application of the composition.

Prior compositions intended for flame or fire proofing foamed or fibrous materials either reduced the compressibility and rebound of the materials or were water or solvent soluble and therefore only a temporary treatment. The compositions of the present invention are designed to impart fire retardancy to such substrates without affecting the resiliency or normal compressibility and rebound of the treated substrate while being inert to water and other solvents.

U.S. Pat. Nos. 4,018,983, 4,064,359 and 4,225,649 disclose fire retardant compositions which incorporate fibrous materials as a functional part of the compositions; while utilizing some components in common with the present formulations, they do so in differing amounts. The compositions of these patents are designed as coatings for electrical cables. U.S. Pat. No. 4,162,342 discloses a process for making foam as an end product, in distinction with the present invention which provides a composition to be applied to previously manufactured foamed substrates. U.S. Pat. No. 3,914,513 discloses the use of chlorinated paraffin wax as a material used in flame retardant compositions. U.S. Pat. Nos. 3,940,549 and 4,027,062 disclose antimony oxide as being useful in flame retardant compositions.

U.S. Pat. No. 4,493,871 discloses the use of chlorinated paraffin wax as a material used in flame retardant compositions as a plasticizer, in distinction with the present invention which uses the material to suppress afterglow, any plasticizing effect being deleterious to the composition. Also mentioned in U.S. Pat. No. 4,493,781 are vinylidine chloride copolymers having higher vinylidine chloride content and a corresponding bound chlorine content than used in the present invention. The use of various metal oxides, in particular antimony pentoxide, is also mentioned but at a higher level than is useful in the present invention.

SUMMARY OF THE INVENTION

In accordance with the present invention a fire retardant composition is provided comprising, in percent by weight of the non-volatile solids therein, an aqueous mixture of: (a) 25-90% of an emulsified halogen containing vinyl polymer with a maximum weight percent bound chlorine of 58%, selected to bind the composition to a combustible, resilient, foamed or fibrous substrate; (b) not more than 4.8% of a metal oxide gas and fume limiting compound; and (c) 1-40% of an afterglow limiting component selected from halogenated naturally occurring oils, fats, and organo phosphates having a maximum halogen content of 50% on the dry weight of the formulation. The formulation usually will contain the above essential components and no fibrous component or plasticizers.

The composition, when applied to a suitable substrate such as polyurethane foam, limits its flammability, combustion rate, fuel contribution, melting and smoke or fume production. Similar results are obtained when the composition is applied to fibrous materials such as those which may be used in a mattress, insulation, upholstery, clothing and general construction materials.

Protection is imparted by surface application to the substrate, such as by brushing or spraying and/or by a through impregnation of the surface and the interior of the substrate, such as by soaking the substrate in the composition. While soaking the substrate provides more protection than a surface treatment (more weight results in more protection), for many applications the surface treatment is adequate.

Typically the present compositions are used as an aqueous mixture with the retardant protection becoming immediately effective upon drying of the aqueous diluent. However, further curing of the product with time enhances the fire protective features of the composition. Full curing may take as long as one week.

Upon initial application to a foam substrate the treated foam may be slightly stiff to the touch compared with the untreated foam. This slight stiffness can be removed by rolling or simply flexing the foam to soften it without loss of the protective properties of the composition. Of most importance, the foam substrate retains its original resiliency in terms of compressibility and rebound to original configuration upon release of compressive forces.

A unique aspect of the present composition relates to the fact that when a piece of treated foam is subjected to open flame burned the fire retardant coating forms an intumescent char interposed between the source of the fire and the underlying unburned foam. As a result potentially harmful dripping of burning foam is eliminated.

The present composition utilizes a binder for the composition to adhere the composition in or on the substrate to be treated. It is noted that the binder is a halogen containing vinyl polymer of no more than 58% bound chlorine on dry weight basis. Although it has been reported that polymers of this type are undesirable in that they emit dangerous chemical species upon combustion, the present compositions do not exhibit such hazardous properties. The metal oxide utilized in the formulation serves to combine with undesirable gases or fumes emitted by the binder and converts them to chemical forms that are not as hazardous but instead contribute to the desired fire retardant protection.

DETAILED DESCRIPTION OF THE PREFERRED EMBODIMENT

In general the fire retardant compositions may be formulated as an aqueous mixture containing about 25-85% by weight of non-volatile solids. In the preferred embodiment the percent by weight of solids is about 60-70% by weight. There are three essential components in the solids in the stated relative proportions. Each of the three components may be a mixture of materials from its component category. For example, a mixture of metal oxides may be used.

(1) Binder

An aqueous emulsified halogen containing vinyl polymer is selected to bind the composition to the substrate. The vinyl polymer is preferably selected from vinyl chloride and vinylidine dichloride polymers and copolymers of no more than 58% bound chlorine on dry weight basis. Copolymers may be formed with ethylene and vinyl chloride comonomers. An alternative is to form copolymers with vinyl chloride or vinylidine dichloride with an acrylic comonomer selected from acrylic and methacrylic esters. Typical of such esters are methyl acrylate, ethyl acrylate, butyl acrylate, 2-ethyl hexyl acrylate, methyl methacrylate, ethyl methacrylate, butyl methacrylate, 2-ethy hexyl methacrylate, or other esters of acrylic acid or methacrylic acid.

The comonomers are combined so as to achieve the specific properties and to limit the polymeric bound chlorine to a maximum bound chlorine content of 58% by weight of the polymer solids. Higher bound chlorine levels have been found to reduce the resiliency of and stiffen the treated foram substrate. In addition higher bound chlorine levels, i.e., 65%+ chlorine have been found to cause undesirable dusting and cracking of the surface layer of the treated substrate. Typically the binder will be present as 25-90% by weight of the nonvolatile solids. More usually the binder will be about 40-90%, and preferable about 60-90% by weight of the solids.

(2) Gas and Fume Limiting Component

The present composition includes a metal oxide which serves as a gas or fume limiting compound. For example, the metal oxide absorbs and/or reacts with halogen which may be given off primarily upon combustion of the polymeric binder in the formulation to form nonhazardous products. The metal oxide may be selected from the following materials: antimony trioxide, antimony tetroxide, antimony pentoxide, aluminum oxide, barium oxide, boron oxide, calcium oxide, silicon dioxide, stannic oxide, stannous oxide, titanium dioxide and zinc oxide. The metal oxide will typically be present in the composition in the amount of 0-4.8% by weight of the non-volatile solids in the composition, more usually about 1-4.5% by weight thereof. Higher levels have been found to embrittle the coating and the foam substrate causing cracking and dusting thus losing protective properties.

(3) Afterglow Limiting Component

The composition includes a component designed to suppress or limit afterglow (afterburn, char, ember) in a substrate that has been subjected to fire. The afterglow limiting component is selected from halogenated naturally occurring (non-petroleum) oils, fats, and organo phosphonates that do not tend to plasticize the polymer or binder which would decrease the resiliency of the treated foam substrate. The maximum halogen, usually chlorine, content of the afterglow limiting material is 50% as higher levels yield a sticky plasticizing material. Also, waxes of higher than 50% chlorine tend to not bloom to the coating surface thus being ineffective in eliminating or limiting afterglow. The following are categories of materials suitable as an afterglow suppressant: hydroxyl containing oligomeric phosphonates, halogenated organo phosphonates, halogenated soybean, cottonseed, peanut or other naturally occurring oils (other than from petroleum) or fats, and substituted organo phosphonates. Generally the afterglow limiting component constitutes about 1-40% by weight of the non-volatile solids in the composition, usually about 10-40%, and preferably about 20-40% by weight of the composition solids.

The present compositions are designed for application to combustible foamed substrates. Typically such foam is formed from a polymer selected from polyurethane, polystyrene-co-butadiene-1,3 and natural rubber. Alternatively the substrate may be a combustible fiber such as a non-woven polyester fibrous substrate.

The following examples represent formulations of the present fire retardant compositions. The examples indicate the dry weight basis of the active components. The remainder of the composition is primarily a soap/surfacant, water diluent system within which the binder is emulsified. The other components may also be introduced into the mixture in aqueous media. For example, the metal oxide is usually added in a water dispersion or suspension water at a suitable alkaline pH. As noted, the solids content is 25-85% by weight. Example 1 is effectively made up to contain about 67% by weight of solids.

EXAMPLE 1

| | | |
|---|---|---|
| (1.) | Polyvinylidine dichloride-co-2-ethyl hexyl acrylate copolymer (58% Cl) A commercially useful material is UNOCAL Chemical Division, UNOCAL 76RES-P 917, polyvinylidine dichloride/acrylic copolymer. | 75.0% of dry weight |
| (2.) | Antimony pentoxide A commercially useful material is Nyacol Products Inc., Nyacol A1530 and Nyacol A1550, which are aqueous dispersions of antimony pentoxide. | 4.5% of dry weight |
| (3.) | Hydroxyl containing oligomeric phosphonate A commercially useful material is Stauffer Chemical Fyrol 51. An alternative commercially available material which may be substituted for or mixed with the Fyrol 51 is Fyrol 6, diethyl-N,N—bis(2-hydroxyethyl) aminomethyl phosphonate. | 20.5% of dry weight |

EXAMPLE 2

| | | |
|---|---|---|
| (1.) | Polyvinyl chloride (50% Cl) | 61.4% of dry weight |
| (2.) | Antimony trioxide | 4.8% of dry weight |
| (3.) | Fyrol 51 | 33.8% of dry weight |

EXAMPLE 3

| | | |
|---|---|---|
| (1.) | Polyethylene vinyl chloride copolymer (47% Cl) | 58.100% of dry weight |

-continued

| (2.) Fyrol 51 | 18.703% of dry weight |
| --- | --- |
| (3.) Fyrol 6 | 18.595% of dry weight |
| (4.) Chlorinated soybean oil (40% Cl) | 4.602% of dry weight |

EXAMPLE 4

This example illustrates use and performance of the fire retardants, employing the composition of Example 1. A sample of polyurethane foam having the dimensions 2"×4"×1" was soaked in the formulation of Example 1 which contained about 67% by weight of solids in water. The sample was removed from the formulation and squeezed on a paper tool. The sample was weighed before and after soaking and indicated a 60% weight increase following the soaking treatment. The treated sample was then subjected to a butane torch at 2500° F. for one minute. The sample was glowing orange in the area of direct flame contact but did not burn and retained its foamed structure.

EXAMPLE 5

Compositions of this invention were subjected to the following tests on a polyurethane foam without any cover fabric: (1) Boston Chair Test: Passed; (2) ASTM E162-Radiant panel, Vertical-5 Watts per centimeter squared for a period of five minutes with (a) Surface Coating of the foam resulted in a 35% weight loss; (b) Saturation of the substrate resulted in a weight loss of 28%; (c) ASTM E162-Radiant panel, Vertical-3.5 Watts per centimeter squared for a period of 2 minutes with a Surface coating resulted in a weight loss of 30%.

What is claimed is:

1. A fire retardant composition comprising, in percent by weight of the non-volatile solids therein, a non-fibrous aqueous mixture of:
   (a) 25–90% of an emulsified halogen containing vinyl polymer of no more than 58% bound chlorine on dry weight basis selected to bind the composition to a combustible, resilient, foamed or fibrous substrate;
   (b) not more than 4.8% of a metal oxide gas and fume limiting compound; and
   (c) 1–40% of an afterglow limiting component selected from halogenated naturally occurring oils and fats, halogenated to no more than 50% on dry weight basis, and organo phosphonates, halogenated organo phosphonates, and substituted organo phosphonates.

2. A fire retardant composition in accordance with claim 1, wherein said halogen containing vinyl polymer is selected from vinyl chloride and vinylidine dichloride polymers and copolymers containing a maximum of 58% chlorine on dry weight basis.

3. A fire retardant composition in accordance with claim 2, wherein said copolymers are formed with ethylene and vinyl chloride comonomers constituting a polymeric bound chlorine content of no more than 50% on dry weight basis.

4. A fire retardant composition in accordance with claim 2, wherein said copolymers are formed with an acrylic comonomer selected from acrylic and methacrylic esters.

5. A fire retardant composition in accordance with claim 2, wherein said metal oxide is selected from antimony trioxide, antimony tetroxide, antimony pentoxide, aluminum oxide, barium oxide, boron oxide, calcium oxide, silicon dioxide, stannic oxide, stannous oxide, titanium dioxide and zinc oxide at a level of no more than 4.8% on dry weight basis.

6. A fire retardant composition in accordance with claim 5, wherein said metal oxide is antimony pentoxide.

7. A fire retardant composition in accordance with claim 2, wherein said afterglow limiting component is a hydroxyl containing oligomeric phosphonate.

8. A fire retardant composition in accordance with claim 2, wherein said halogen containing vinyl polymer content is 40–90%, said metal oxide content is 1–4.5%, and said afterglow limiting compound content is 10–40%.

9. A fire retardant composition in accordance with claim 1, wherein halogen containing vinyl polymer content is 60–90% and said afterglow limiting component content is 20–40%.

10. A fire retardant composition in accordance with claim 1, wherein said halogen containing vinyl polymer content is about 60% of a polyvinylidine dichloride-co-2-ethyl hexyl acrylate polymer; said metal oxide content is about 4.8% of antimony pentoxide; and said afterglow limiting component content is about 20.2% of a hydroxyl containing oligomeric phosphonate.

11. A resilient foamed combustible substrate containing an effective amount sufficient to impart fire retardancy thereto of a fire retardant composition comprising, in percent by weight of the non-volatile solids therein, an aqueous mixture of:
   (a) 25–90% of an emulsified halogen containing vinyl polymer selected to bind the composition to a combustible, resilient, foamed or fibrous substrate;
   (b) 0–4.8% of a metal oxide gas and fume limiting compound; and
   (c) 1–40% of an afterglow limiting component selected from halogenated naturally occurring oils and fats, containing a maximum of 50% bound chlorine and organo phosphonates, halogenated organo phosphonates and substituted organo phosphonates.

12. A method of reducing the flammability of a resilient combustible foamed article comprising applying to said article an effective amount of a fire retardant composition comprising, in percent by weight of the non-volatile solids therein, an aqueous mixture of:
   (a) 25–90% of an emulsified halogen containing vinyl polymer, having a maximum of 58% chlorine on a dry weight basis, selected to bind the composition to a combustible, resilient, foamed or fibrous substrate;
   (b) not more than 4.8% of a metal oxide gas and fume limiting compound; and
   (c) 1–40% of an afterglow limiting component selected from halogenated naturally occurring oils and fats, having a maximum halogen content of 50% chlorine on dry weight basis, and organo phosphonates, halogenated organo phosphonates and substituted organo phosphonates.

13. A method of reducing flammability in accordance with claim 12, wherein said fire retardant composition is applied to the article by brushing or spraying, whereby substantially only the surface of the article receives said fire retardant composition.

14. A method of reducing flammability in accordance with claim 12, wherein said fire retardant composition is applied by soaking the article in said composition whereby the article receives said composition on its surface and internally.

15. A method of reducing flammability in accordance with claim 12 wherein said foamed article is formed from a polymer selected from polyurethane, polystyrene-co-butadiene-1,3 and natural rubber.

16. A method of reducing flammability in accordance with claim 15, wherein said foamed article is formed from a polyurethane polymer.

17. A method of reducing flammability in accordance with claim 12, wherein said halogen containing vinyl polymer, containing a maximum of 58% bound chlorine on a dry weight basis, is selected from vinyl chloride and vinylidine dichloride polymers and copolymers.

18. A method of reducing flammability in accordance with claim 17, wherein said metal oxide is selected from antimony trioxide, antimony tetroxide, antimony pentoxide, aluminum oxide, barium oxide, boron oxide, calcium oxide, silicon dioxide, stannic oxide, stannous oxide, titanium dioxide and zinc oxide and limited to a maximum of 4.8% on a dry weight basis of the composition.

19. A method of reducing flammability in accordance with claim 18, wherein said halogen containing vinyl polymer limited to a maximum bound chlorine content of 58% on dry weight basis content is 40–90%, said metal oxide content is 4.5%, and said afterglow limiting component content is 10–40% with halogenated afterglow limiting components having a maximum bound chlorine content of 50%.

20. A method of reducing flammability in accordance with claim 19, wherein said halogen containing vinyl polymer content is about 75% of a polyvinylidine dichloride-co-2-ethyl hexyl acrylate copolymer; said metal oxide content is about 4.8% of antimony pentoxide, and said afterglow limiting component content is about 20.2% of a hydroxyl containing oligomeric phosphonate.

21. A method for reducing or eliminating melting and dripping in accordance with claims 13 and 14 when applied to the resilient substrate.

22. A method for reducing flammability in accordance with claim 21, whereby an intumescent char is formed that substantially protects that substrate from further damage when in contact with a flame.

* * * * *